United States Patent
Ryan et al.

(10) Patent No.: US 12,458,727 B2
(45) Date of Patent: Nov. 4, 2025

(54) ANTI-MICROBIAL MEDICAL MATERIALS AND DEVICES

(71) Applicant: RyMed Technologies, LLC, Franklin, TN (US)

(72) Inventors: Dana Wm. Ryan, Nolensville, TN (US); Mitchell Corey Sanders, Grafton, MA (US)

(73) Assignee: RYMED TECHNOLOGIES, LLC, Franklin, TN (US)

( * ) Notice: Subject to any disclaimer, the term of this patent is extended or adjusted under 35 U.S.C. 154(b) by 0 days.

(21) Appl. No.: 17/406,934

(22) Filed: Aug. 19, 2021

(65) Prior Publication Data

US 2022/0354985 A1  Nov. 10, 2022

Related U.S. Application Data

(63) Continuation of application No. 15/473,435, filed on Mar. 29, 2017, now abandoned.

(60) Provisional application No. 62/314,832, filed on Mar. 29, 2016.

(51) Int. Cl.

| | |
|---|---|
| A61L 15/22 | (2006.01) |
| A61L 15/42 | (2006.01) |
| A61L 27/54 | (2006.01) |
| A61L 27/56 | (2006.01) |
| A61L 29/04 | (2006.01) |
| A61L 29/08 | (2006.01) |
| A61L 29/14 | (2006.01) |
| A61L 29/16 | (2006.01) |
| A61L 31/14 | (2006.01) |
| A61L 31/16 | (2006.01) |
| A61M 25/00 | (2006.01) |

(52) U.S. Cl.
CPC ............. *A61L 15/225* (2013.01); *A61L 15/42* (2013.01); *A61L 27/54* (2013.01); *A61L 27/56* (2013.01); *A61L 29/04* (2013.01); *A61L 29/08* (2013.01); *A61L 29/146* (2013.01); *A61L 29/16* (2013.01); *A61L 31/146* (2013.01); *A61L 31/16* (2013.01); *A61L 2300/106* (2013.01); *A61L 2300/404* (2013.01); *A61L 2400/08* (2013.01); *A61L 2400/12* (2013.01); *A61M 25/0045* (2013.01); *A61M 2025/0056* (2013.01)

(58) Field of Classification Search
CPC ........ A61L 15/225; A61L 15/42; A61L 29/04; A61L 29/08; A61L 29/16
See application file for complete search history.

(56) References Cited

U.S. PATENT DOCUMENTS

| | | | | |
|---|---|---|---|---|
| 6,900,055 | B1 * | 5/2005 | Fuller | A61P 31/00 |
| | | | | 435/395 |
| 2003/0176516 | A1 * | 9/2003 | Underwood | C08J 9/32 |
| | | | | 521/50 |
| 2006/0051393 | A1 * | 3/2006 | Heruth | A61L 27/54 |
| | | | | 427/2.24 |
| 2010/0092535 | A1 * | 4/2010 | Cook | A61L 31/16 |
| | | | | 623/1.42 |
| 2017/0079909 | A1 * | 3/2017 | Zhang | A61K 35/17 |

OTHER PUBLICATIONS

Sergeeva, Adv Mater Interfaces, 2, 2015 (Year: 2015).*

* cited by examiner

*Primary Examiner* — Susan T Tran
*Assistant Examiner* — William Craigo
(74) *Attorney, Agent, or Firm* — Ryan D. Levy; Lucian Wayne Beavers; Patterson Intellectual Property Law, PC

(57) ABSTRACT

The present disclosure relates generally to materials and medical devices impregnated with antimicrobial compounds. More specifically, the materials are medical matrix materials comprising nanopores or nanochannels in which the antimicrobial compounds are disposed. In other embodiments, medical matrix materials comprises nanomaterials and antimicrobials distributed throughout the material. The materials described herein are useful for a broad spectrum of medical devices and consumer products. The present disclosure further provides methods of making the antimicrobial materials and medical devices disclosed herein.

10 Claims, 7 Drawing Sheets

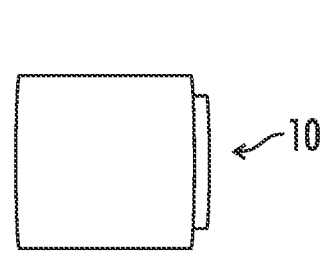
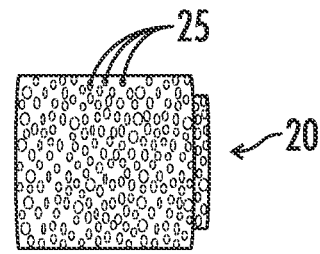
FIG. 7A  FIG. 7B
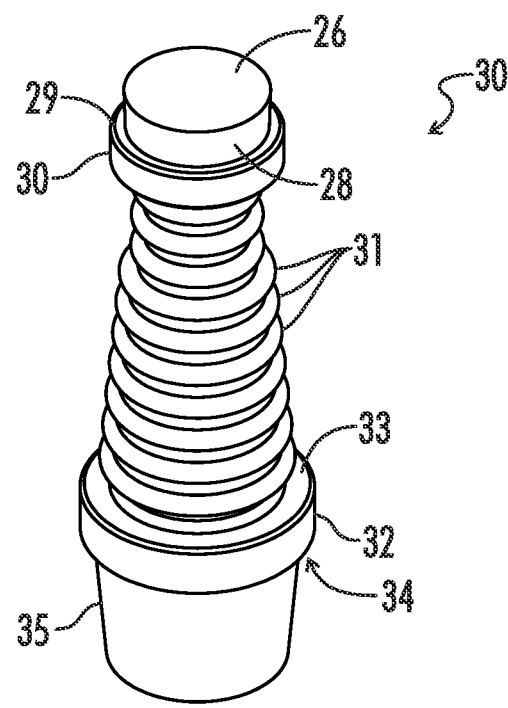
FIG. 7C

ANTI-MICROBIAL MEDICAL MATERIALS AND DEVICES

RELATED APPLICATION

This application is a continuation of U.S. patent application Ser. No. 15/473,435, filed Mar. 29, 2017, which claims the benefit of priority to U.S. Provisional Application No. 62/314,832, filed on Mar. 29, 2016, the contents of which are hereby incorporated by reference in their entirety.

TECHNICAL FIELD OF THE INVENTION

The present disclosure relates generally to materials and medical devices comprising antimicrobial compounds. More specifically, the materials are medical matrix materials comprising nanopores or nanochannels in which the antimicrobial compounds are impregnated. Alternatively, the medical materials comprise a nanomaterial and an antimicrobial agent. The materials described herein are useful for a broad spectrum of medical devices and consumer products.

BACKGROUND OF THE INVENTION

Medical devices pose a risk of exposing patients to bacteria and other pathogens, resulting in infections, particularly devices made of medical grade polymers such as silicone rubber and plastics. In-dwelling catheters, catheter connector devices, implantable medical devices and wound dressings pose particular risks for infection because they are often used for extended exposure to bodily fluids and tissues. Liquid silicone rubber (LSR), for example, is commonly used in the manufacturing of medical devices and medical equipment including, but not limited to, septa for vascular access and needle free IV connectors, valves, tubing and surgical implants. It is desirable to treat or impregnate these devices with an antimicrobial agent such as silver, chlorhexidine (e.g., chlorhexidine gluconate (CHG) or chlorhexidine diacetate (CHDA), or quaternary ammonium compounds (QAC)). The challenge is that LSR formulations are generally too rigid (high durometer) and highly cross-linked to allow for sufficient impregnation with bioavailable antimicrobials to provide for sustained release of an antimicrobial agent. Other medical grade polymers and plastics face similar issues.

Accordingly, there is a need for improved medical materials capable of being impregnated with antimicrobial compounds such that an antimicrobial effect has a sufficient duration to prevent infection. Specifically, a process for impregnating medical materials used in medical devices or consumer products with nanopores or nanochannels would allow antimicrobials to be loaded into the nanopores or nanochannels. Such materials would reduce infections, particularly hospital acquired infections, such as catheter-related blood stream infections (CRBSI) and surgical site infections (SSI). The present disclosure addresses this need.

BRIEF SUMMARY OF THE INVENTION

Briefly, the present disclosure relates to antimicrobial materials and medical devices comprising the same. More particularly, the present disclosure relates to medical matrix materials, such as LSR, plastics or other polymers, having nanoparticles incorporated therein. The nanoparticles are, in some embodiments nanospheres or nanotubes, of which a portion may be removed from the material to produce nanopores or nanochannels, which are then loaded with an antimicrobial agent or combination of antimicrobial agents.

In an embodiment, the antimicrobial agent (or agents) is advantageously loaded in to the nanochannels or nanopores of the material. In particular embodiments, the nanopores or nanochannels are disposed on or near a surface of the material or device.

The nanopores or nanochannels in some embodiments have a diameter ranging from about 10 to about 200 nm. In some embodiments, the antimicrobial agent is selected from the group consisting of an antibacterial agent, an antiviral agent, an antifungal agent and combinations thereof. In particular embodiments, the antimicrobial agent is selected from the group consisting of a silver compound, chlorohexidine, a quaternary ammonium compound, an alcohol, chlorine, chlorine dioxides, peroxides, aldehydes, triclosan, triclocarban, benzalkonium chloride, and mixtures thereof.

In alternative embodiments, the antimicrobial materials comprise a medical matrix having a nanomaterial and an antimicrobial agent or combination of agents incorporated therein. In such embodiments, the nanopores or nanotubes are not removed. Furthermore, in such embodiments, the antimicrobial agent can be distributed throughout the medical matrix material or can be associated with the surface of the material.

In some embodiments, the nanomaterial is selected from the group consisting of calcium carbonate, liposomes, carbon nanotubes, nano gold particles, silica nanoparticles or a combination thereof.

The aforementioned materials may further be formed into a desired shape for use in a medical device. The medical device can be a consumer device or medical care device including, but not limited to, septa, needle-free injection port IV connectors, valves, tubing, implantable medical devices, or surgical instruments. Other uses for the antimicrobial medical devices include wound care, urology, orthopedics, oral care, neurological disease, women's health, hemodialysis, transplants, vision care, diabetes care, infection prevention, cardiovascular disease, and prosthetics. The present materials also may be used as coatings in medical products, devices, consumer products or for industrial products.

The present disclosure also provides a method for preparing an antimicrobial medical matrix material having nanopores or nanochannels with an antimicrobial agent disposed therein. In some embodiments, the method comprises providing a prepolymeric material, polymerizing the prepolymeric material in the presence a nanomaterial to form a medical matrix having the nanomaterial disposed therein, removing the nanomaterial to provide the nanopores or nanochannels, and loading the nanopores or nanochannels thus formed with the antimicrobial agent. The nanomaterial may be removed from the medical matrix chemically or with heat or a combination thereof.

In another embodiment, a method of preparing an antimicrobial medical material comprises providing a prepolymeric material, polymerizing the prepolymeric material in the presence a nanomaterial and an antimicrobial agent (or agents) to form a medical matrix having the nanomaterial and antimicrobial agent disposed therein. In such embodiments, the nanomaterial is not removed from the medical matrix material.

It is to be understood that both the foregoing general description and the following detailed description present embodiments of the disclosure and are intended to provide an overview or framework for understanding the nature and character of the disclosure as it is claimed. The description serves to explain the principles and operations of the claimed subject matter. Other and further features and advantages of the present disclosure will be readily apparent to those skilled in the art upon a reading of the following disclosure.

BRIEF DESCRIPTION OF THE SEVERAL VIEWS OF THE DRAWINGS

FIG. 7A depicts a medical septum (10) that can be formed from the materials described herein. FIG. 7B depicts a septum (20) comprising a medical material of the present disclosure having nanopores loaded with an antimicrobial agent. The nanopores are open to the surface such that an expanded view would show a pockmarked surface (25). FIG. 7C depicts an exemplary medical device comprising the medical materials of the present disclosure. This non-limiting example depicts a resilient barrier (30) useful in injection port assemblies. The resilient microbial barrier 30 can include a flat septum surface 26. The barrier includes an upper sealing surface 28 and a lower sealing surface 29. The resilient microbial barrier 25 can include an upper centering circular flange 30 and a series of spring-like accordion flutes. A lower lower circular sealing flange 32 has two sealing surfaces: a lower flange upper sealing surface 33 and a lower flange lower sealing surface 34. The resilient barrier 30 also can include a tapered well ring 35.

DETAILED DESCRIPTION

Figure 1:
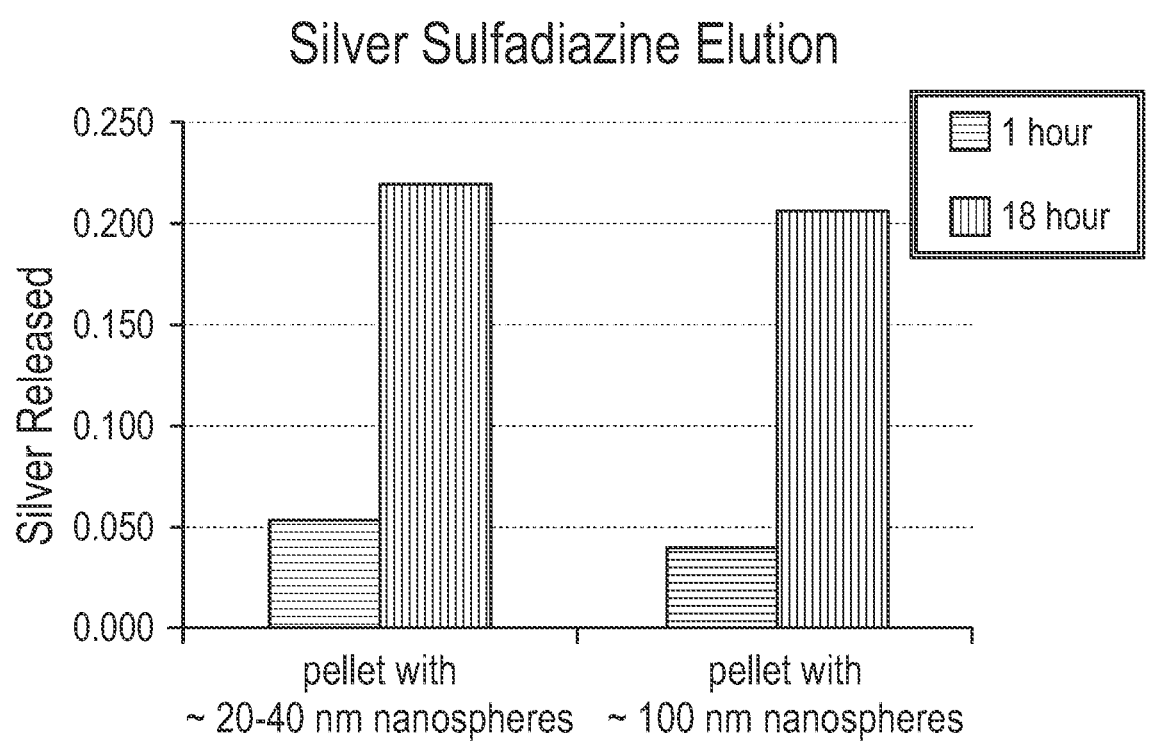
FIG. 1 is a graph depicting the elution of silver sulfadiazine from an injection molded silicone rubber pellet containing about 20-40 nm $CaCO_3$ nanospheres and an injection molded silicone rubber pellet containing about 100 nm $CaCO_3$ nanospheres over 1 hour and 18 hour time periods.

Reference now will be made in detail to the embodiments of the present disclosure, one or more examples of which are set forth herein below. Each example is provided by way of explanation of the compositions, devices and methods of the present disclosure and is not a limitation. In fact, it will be apparent to those skilled in the art that various modifications and variations can be made to the teachings of the present disclosure without departing from the scope of the disclosure. For instance, features illustrated or described as part of one embodiment, can be used with another embodiment to yield a still further embodiment.

Thus, it is intended that the present disclosure covers such modifications and variations as come within the scope of the appended claims and their equivalents. Other objects, features and aspects of the present disclosure are disclosed in or are obvious from the following detailed description. It is to be understood by one of ordinary skill in the art that the present discussion is a description of exemplary embodiments only and is not intended as limiting the broader aspects of the present disclosure.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compounds, devices and/or methods disclosed and claimed herein may be made and/or executed without undue experimentation in light of the present disclosure. While the compounds, devices and/or methods of this invention have been described in terms of the embodiments included herein, it will be apparent to those of ordinary skill in the art that variations may be applied to the compounds, devices and/or methods without departing from the concept, spirit, and scope of the invention. All such similar substitutes and modifications apparent to those skilled in the art are deemed to be within the spirit, scope, and concept of the invention as defined by the appended claims.

The present disclosure generally provides an antimicrobial medical material or a device comprising the material. In one embodiment, the material comprises a medical matrix material having a nanomaterial and an antimicrobial agent incorporated therein. More particularly, the material may comprise a medical matrix having nanopores or nanochannels and an antimicrobial agent disposed within the nanopores or nanochannels. Nanocahnnels and nanopores may be formed by providing a medical matrix comprising a nanomaterial and removing a portion of the nanomaterial from the medical matrix, leaving behind pores or channels. The medical matrix can then be treated with an antimicrobial agent such that the nanopores or nanochannels incorporate the antimicrobial agent.

The antimicrobial medical materials of the present disclosure are impregnated with nanochannels or nanopores. The nanochannels or nanopores may be throughout the material or device, or they may be located at or near the surface of the material. For example, when the material is shaped into a medical device, a surface of the device may contain nanopores or nanochannels at a depth of about 20 to about 500 nm. In these embodiments, the material or the device has a pockmarked surface of nanopores or nanochannels (see, e.g., FIG. 7C).

The nanopores or nanochannels, in some embodiments, have a diameter ranging from about 5 nm to about 200 nm. In some embodiments, the device or material comprise nanopores have a diameter ranging from about 5 nm to about 50 nm, or about 10 nm to about 40 nm, or about 20 nm to about 40 nm. In other embodiments, the material or device comprises nanochannels having a diameter ranging from about 50 nm to about 200 nm, or about 100 nm to about 200 nm. Furthermore, in embodiments comprising nanochannels, the length of the nanochannels ranges from about 100 nm to about 2 µm The nanopores or channels are advantageously incorporated into the materials by impregnating the medical matrix with a nanomaterial and then removing the nanomaterial, leaving behind the nanochannel or pore. Suitable materials that may be used to form the nanopores or nanochannels include any nanosphere or nanomaterial derived from a natural or synthetic polymeric substrate, including but not limited to, $CaCO_3$ nanospheres, Dungeness crab shells, carbon nanotubes (e.g., graphene or MWCNT), liposomes, nanogold (AuNP's), or silica. In preferred embodiments, the nanochannels or nanopores are prepared from $CaCO_3$, such as nanoparticles or Dungeness crab shells. Dungeness crab shells contain a network of nanochannels that are composed of calcium carbonate. These $CaCO_3$ nanochannels have been studied for potential use in nanostructured battery electrodes (Yao H1, Zheng G, Li W, McDowell M T, Seh Z, Liu N, Lu Z, Cui Y. Nano Lett. 2013 Jul. 10; 13(7):3385-90. doi: 10.1021/nl401729r. Epub 2013 Jun. 17. Crab shells as sustainable templates from nature for nanostructured battery electrodes).

An advantage of using calcium carbonate based nanochannels or nanospheres impregnated into the medical matrix is that after polymerization of the matrix, the nanochannels or nanospheres can be removed by treating the impregnated matrix with dilute acid (e.g. citric acid 1-3%) at an elevated temperature 60-70° C. to dissolve and then remove the calcium carbonate deposits. Once the nanopores or nanochannels have been opened up, an antimicrobials such as silver, chlorhexidine, CHG or QAC may be loaded therein. While not being bound by theory, it is believed that the antimicrobial agent is absorbed by the nanopores or channels at or near the surface of the material or device, thereby providing a prolonged release.

In a particular embodiment, $CaCO_3$-based nanospheres or nanochannels are provided in a medical matrix, such as an LSR formulation. This material may optionally be formed into a predetermined shape and then treated with citric acid to remove the calcium carbonate nanostructures. The resulting nanopores or nanochannels can be efficiently loaded with an antimicrobial agent.

In an alternative embodiment, the medical materials comprise a medical matrix having a nanomaterial and an antimicrobial agent or agents distributed throughout. In such embodiments, the medical matrix is formed (e.g., polymerized) in the presence of the nanomaterial and the antimicrobial agent, and the nanomaterial is not removed, but instead remains in the matrix. Nanomaterials useful in these embodiments include calcium carbonate, liposomes, carbon nanotubes (graphene), nanogold (AuNP's), and silica. Furthermore, these nanomaterials surprisingly improve the compression modulus of the medical matrix such that the resulting antimicrobial material is more flexible without the requirement of an emollient such as phenol oil. In such an embodiment, the antimicrobial can be loaded with the nanomaterials during the injection molding process Furthermore, in these embodiments, the antimicrobial agent can be effective for up to 10 days, for example 1 to 10 days, or 1 to 7 or 8 days.

The medical matrix material may be any suitable medically acceptable material, such as plastics, other polymers or silicone rubber. In particular embodiments, the medical matrix is selected from the group consisting of silicone rubber, latex, polyisoprene, neoprene, polypropylene, polyurethane, poly(methyl methacrylate), poly(lactine-co-glycolide), ε-caprolactone, and galatin/ε-caprolactone, collagen-GAG, PLA, PGA, PLA-PGA co-polymers, poly (anhydrides), poly(hydroxy acids), poly(ortho esters), poly (propylfumerates), poly(caprolactones), poly (hydroxyvalerate), polyamides, polyamino acids, polyacetals, polycyanoacrylates, polysaccharides, polypyrrole, polyanilines, polythiophene, polystyrene, polyesters, polyureas, poly(ethylene vinyl acetate), polypropylene, polymethacrylate, polyethylene, polycarbonates, poly(ethylene oxide), co-polymers of the above, mixtures of the above, and adducts of the above. In an exemplary embodiment, the polymer scaffolds are fabricated using poly(methyl methacrylate) and mixtures thereof. The above matrix materials may be moldable or extrudable during manufacturing, and the final products may be soft and pliable, as would be suitable for use in septa or flexible coatings, or the matrix materials may be harder plastics that are not flexible, depending on the desired application.

In a particular embodiment, the medical matrix material is a silicone rubber, particularly a liquid silicone rubber. Liquid silicone rubbers are widely available and are generally recognized as a safe for use in medical applications.

In certain embodiments, the antimicrobial agent is selected from the group consisting of an antibacterial agent, an antiviral agent, an antifungal agent and combinations thereof. Furthermore, in some embodiments, the antimicrobial agent is selected from the group consisting of a silver compound, chlorhexidine (e.g. chlorhexidine gluconate or chlorhexidine diacetate), a quaternary ammonium compound, an alcohol, chlorine, chlorine dioxide, peroxides, aldehydes, triclosan, triclocarban, benzalkonium chloride, and mixtures thereof. Silver compounds particularly useful as antimicrobial agents in the present materials and devices include silver chloride, silver sulfadiazine, silver nitrate and combinations thereof. In other embodiments, the chlorhexidine is chlorhexidine diacetate, chlorhexidine gluconate, or mixture thereof. In some embodiments, the quaternary ammonium compound is poly(diallyldimethylammonium chloride) (polyDADMAC).

In still further embodiments, the antimicrobial agent comprises: a silver compound and a chlorhexidine; a silver compound and polyDADMAC; chlorhexidine and polyDADMAC; or a chlorhexidine gluconate, a silver compound and polyDADMAC.

The use of silver, CHG, and QAC compounds in combination can be a challenge due to their different solubilities. For example, buffers or solvents that optimize the solubility of one component may be incompatible with a second component. Specifically, CHG is soluble in ethanol, but ethanol will precipitate silver. Conversely Tsipouras et al., (1995) has described buffers that make silver chloride and silver sulfadiazine very soluble. However, these buffers are incompatible with CHG or QAC. Yet, it is desirable in some embodiments to include more than one type of antimicrobial agent in the materials and devices of the present application.

Accordingly, the present disclosure also provides a method of making a nanocrystalline silver compound that can be co-loaded with other antimicrobials (CHG, QAC, etc.). The benefit is that more than one antimicrobial can be used simultaneously to make a mixture of antimicrobials that are stronger or have a broad spectrum antimicrobial activity against gram negative bacteria, gram positive bacteria, and fungi (*Candida*, spp.). Accordingly, in some embodiments, the antimicrobial agent, particular a silver based antimicrobial agent, is nanocrystalline.

The antimicrobial materials and devices of the present disclosure are advantageously effective against a variety of pathogens. Such pathogens may be present particularly in hospital settings. Pathogens include bacteria, viruses and fungi. More particularly, the materials and devices of the present disclosure are effective against gram positive, gram negative, anaerobic and/or aerobic bacteria.

In other embodiments, the antimicrobial devices and materials are effective against fungi, such as *Candida* sp. including *C. albicans, C. dubliniensis, C. tropicalis, C. glabrata, C. parapsilosis* (sensu stricto), *C. orthopsilosis, C. metapsilosis, Meyerozyma guilliermondii* (*C. guilliermondii*), *Pichia kudriavzevii* (*C. krusei*), *Clavispora lusitaniae* (*C. lusitaniae*), or *C. intermedia*.

In still further embodiments, the antimicrobial devices and materials are effective against viruses, including but not limited to, enteroviruses, rhinoviruses, adenovirus, coronavirus, coxsackievirus, echovirus, enterovirus, orthomyxovirus, paramyxovirus, norovirus, or respiratory syncytial virus.

Furthermore, the nanopores or channels provide for a prolonged release of the antimicrobial, thus extending the antimicrobial effect. For example, the antimicrobial agent may be released from the material over a period of hours, days or weeks. In particular embodiments, the antimicrobial agent is released over a period of about 1 day to about 10 days, or about 1 to about 7 or 8 days.

The antimicrobial material or medical device of the present disclosure may be a consumer or professional care product, including wound care, urology, orthopedics, oral care, hemodialysis, neurological disease, women's health, vision care, diabetes care, infection prevention, cardiovascular disease or prosthetic. In particular embodiments, the medical device is a component for use with in-dwelling catheters or intravenous lines, such as a septum, a needle-free injection port connector, a valve or tubing. The device in other embodiments may be an orthopedic implant, vascular access and infusion therapy devices or stents. In other embodiments, the device is an implantable medical device or a surgical instrument.

Examples of personal care products include but are not limited to toothbrushes and other dental care products, contact lenses and wound dressings.

The present disclosure further provides methods of preparing the above-described materials and devices having nanopores or nanochannels and an antimicrobial agent disposed therein. In some embodiments, the method comprises providing a prepolymeric material; polymerizing the prepolymeric material in the presence of a nanomaterial to form a polymer having the nanomaterial disposed therein; removing the nanomaterial to expose the nanopores or nanochannels, and loading the nanopores or nanochannels with the antimicrobial agent to provide the antimicrobial medical device.

The medical matrix material may be any known in the art, and in particular, those described herein above. The nanomaterial may be selected from the group consisting of calcium carbonate (such as Dungeness crab shells or nanospheres), liposomes, carbon nanotubes, nano gold particles, silica nanoparticles and combinations thereof. The medical polymer having nanomaterial disposed therein after the polymerization step may comprise, in some embodiments, about 0.5% to about 20% by weight of the nanomaterial, about 1% to about 10% by weight of the nanomaterial, about 1% to about 5% by weight of the nanomaterial, or about 5% to about 10% by weight of the nanomaterial.

In an exemplary embodiment, the medical matrix is a liquid silicone rubber. Thus, the liquid silicone rubber is polymerized in the presence of a nanomaterial such that the nanomaterial is incorporated therein. The medical matrix may optionally be molded, cut, or extruded into a predetermined shape before or after the polymerization step.

The nanomaterial may then be removed to open the nanopores or nanochannels. In some embodiments, the nanomaterial is removed by treatment with a solution of a weak acid, such as about 1% to about 5% citric acid, about 0.1% to about 0.5% hydrochloric acid, about 0.1 to about 2% sulfuric acid, about 0.1 to about 2% phosphoric acid or a mixture thereof. The treatment is for a period of time sufficient to dissolve the nanomaterials. In some embodiments, the nanomaterials at or near the surface (e.g., within 10 nm to 500 nm, or 10 nm to 200 nm) of the device or material are dissolved.

When the nanomaterial comprises $CaCO_3$, it may be removed by treatment with a weak acid, such as about 1% to about 3% citric acid. Elevated temperature may also be used in combination with the acid to facilitate removal of the $CaCO_3$.

Another embodiment of making an antimicrobial medical material comprises providing a prepolymeric material; polymerizing the prepolymeric material in the presence of a nanomaterial and an antimicrobial agent to form a polymer having the nanomaterial and antimicrobial agent disposed therein. In this embodiment, the nanomaterial is not removed.

The medical matrix material used in this method may be any known in the art, and in particular, those described herein above. The nanomaterial may be selected from the group consisting of calcium carbonate (such as Dungeness crab shells or nanospheres), liposomes, carbon nanotubes, nano gold particles, silica nanoparticles and combinations thereof. The medical polymer having nanomaterial disposed therein after the polymerization step may comprise, in some embodiments, about 0.5% to about 20% by weight of the nanomaterial, about 1% to about 10% by weight of the nanomaterial, about 1% to about 5% by weight of the nanomaterial, or about 5% to about 10% by weight of the nanomaterial. The medical polymer further comprises about 0.5 to about 10% by weight of the antimicrobial agent, or about 0.5 to about 5% by weight of the antimicrobial agent.

In an exemplary embodiment, the medical matrix is a liquid silicone rubber. Thus, the liquid silicone rubber is polymerized in the presence of a nanomaterial and an antimicrobial agent such that the nanomaterial is incorporated therein. The medical matrix may optionally be molded, cut, or extruded into a predetermined shape before or after the polymerization step. In an exemplary embodiment of this method, the medical matrix is a silicone rubber, the nanomaterial is $CaCO_3$ nanospheres, and the antimicrobial is chlorhexidine gluconate (CHG).

All references to singular characteristics or limitations of the present disclosure shall include the corresponding plural characteristic or limitation, and vice versa, unless otherwise specified or clearly implied to the contrary by the context in which the reference is made.

The methods and compositions of the present disclosure, including components thereof, can comprise, consist of, or consist essentially of the essential elements and limitations of the embodiments described herein, as well as any additional or optional ingredients, components or limitations described herein or otherwise useful in the present materials.

As used herein, the term "about" should be construed to refer to both of the numbers specified as the endpoint(s) of any range. Any reference to a range should be considered as providing support for any subset within that range.

Examples are provided to illustrate some embodiments of the materials and devices of the present disclosure but should not be interpreted as any limitation thereon. Other embodiments within the scope of the claims herein will be apparent to one skilled in the art from the consideration of the specification. It is intended that the specification, together with the example, be considered to be exemplary only, with the scope and spirit of the disclosure being indicated by the claims which follow the example.

EXAMPLES

To isolate nanochannels from Dungeness crab, crabs were boiled for 10 minutes in water and then rinsed them in cold water for five minutes. The crab shell carapace was removed. The top shell (carapace) was removed and cut into pieces. The shell was then baked at 300° F. for 4 hours to denature the proteins and then the shell was ground for 5 minutes in a coffee grinder to form a fine powder.

Calcium carbonate nanospheres (20 nm-100 nm) were purchased from Skyspring Nanomaterials Inc. having a purity of 99%.

Crab shell nanochannels, $CaCO_3$ nanosphere particles or carbon nanotubes as a control were polymerized with a 50:50 mixture of LSR 50 A and 60 A durometers. The LSR-$CaCO_3$ nanomaterial mixture was blended with an industrial drill and then injection molded at a high temperature 100-300° C. using standard methods skilled in the art to form LSR impregnated with the nanomaterials at a final concentration of 1%-10%. Molds to make the nanoparticle embedded LSR parts were either made of PLA with a 3D printed (Makerbot Replicator 2X) or the molds were cast out of aluminum for scale-up manufacturing.

Figure 2:
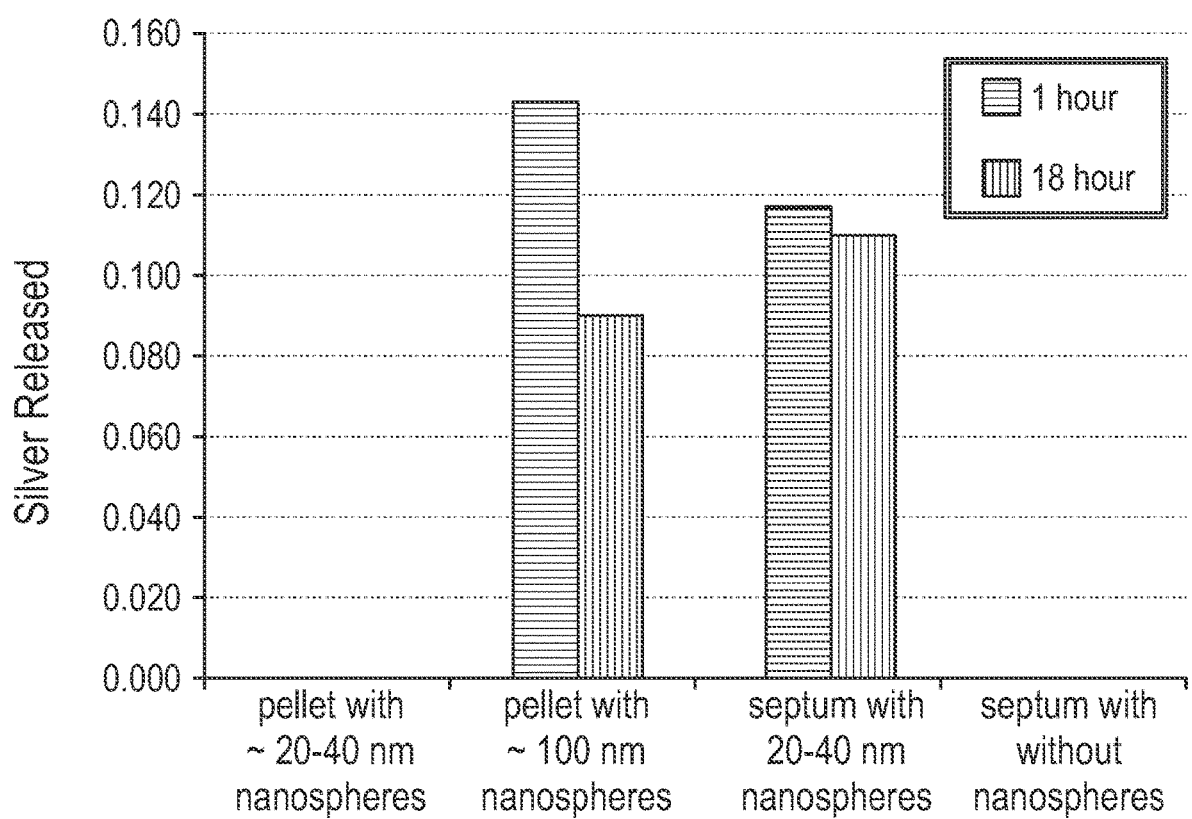
FIG. 2 is a graph depicting the elution of silver nitrate from an injection molded silicone rubber pellet containing about 20-40 nm $CaCO_3$ nanospheres, an injection molded silicone rubber pellet containing about 100 nm $CaCO_3$ nanospheres, a direct molded septum containing about 100 nm $CaCO_3$ nanospheres and a direct molded silicone rubber septum without $CaCO_3$ nanospheres over 1 hour and 18 hour time periods.
Figure 3:
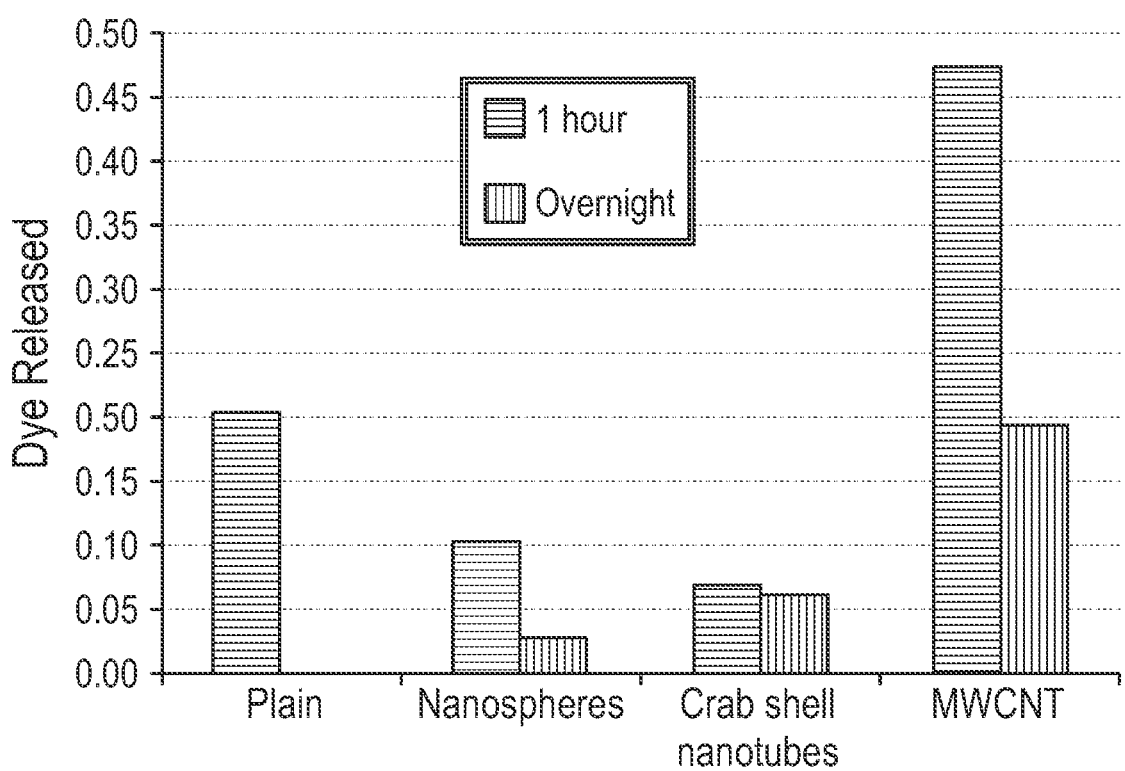
FIG. 3 demonstrates the release of a blue dye from silicone rubber containing no nanomaterials, $CaCO_3$ nanoparticles, nanotubes from Dungeness crab shells and multiwall carbon nanotubes (MWCNT). Untreated silicone rubber can non-specifically bind some dye, but did not demonstrate extended release. MWCNT had good release of blue dye, but they can be more expensive than calcium carbonate or crab shell nanochannels and nanospheres.
Figure 4:
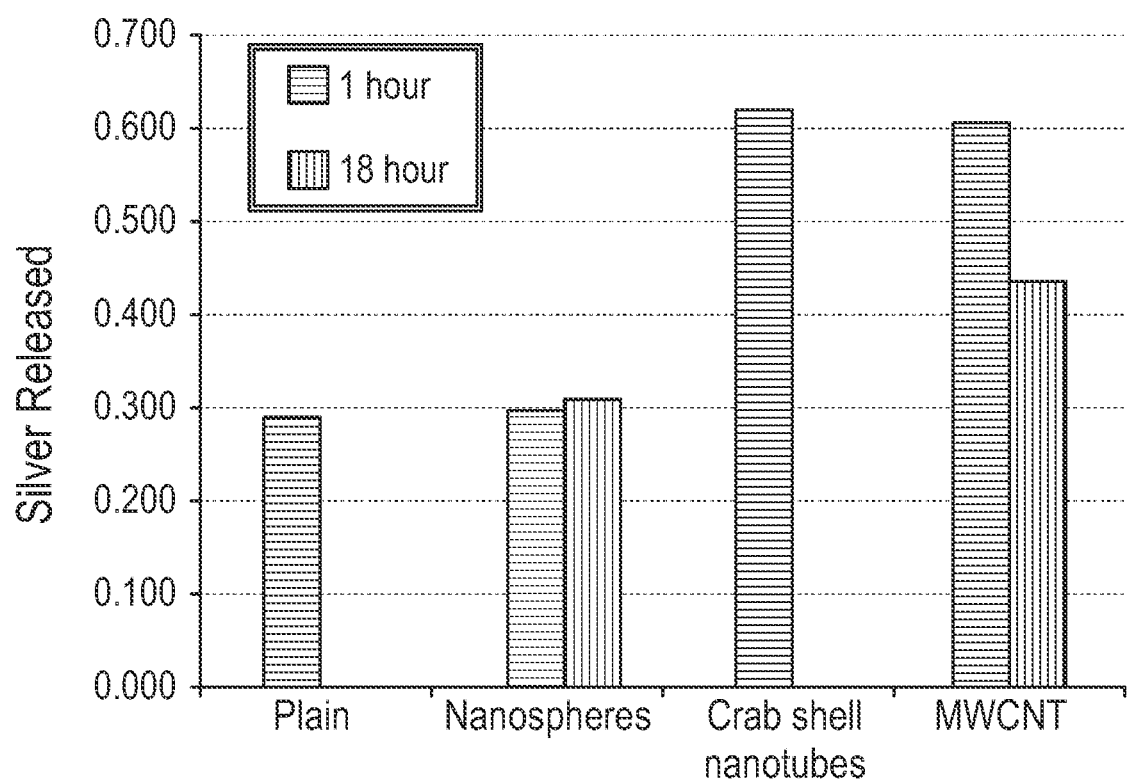
FIG. 4 is a graph depicting the release of silver sulfadiazine from silicone rubber containing no nanomaterials, $CaCO_3$ nanoparticles, nanotubes from Dungeness crab shells and multiwall carbon nanotubes (MWCNT). Untreated silicon rubber can non-specifically bind some silver, but did not demonstrate extended release capability.
Figure 5:
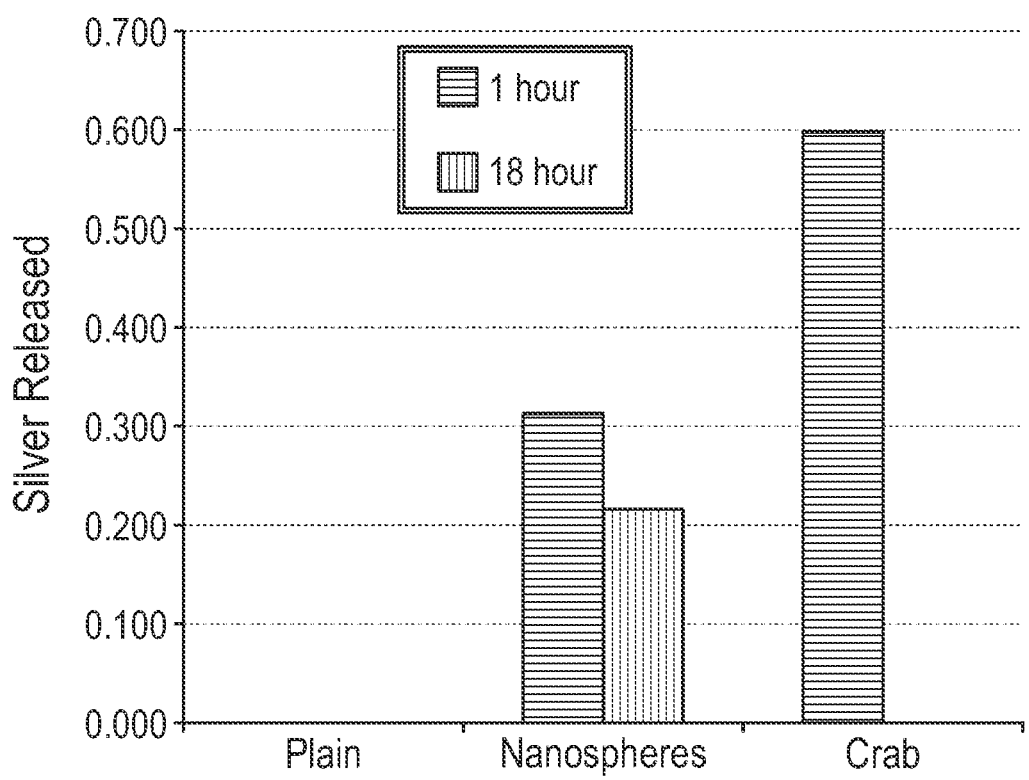
FIG. 5 is a graph depicting the release of silver sulfadiazine from silicone rubber containing no nanomaterials, $CaCO_3$ nanoparticles, nanotubes from Dungeness crab shells. The crab nanochannels loaded more silver than the nanospheres, but the nanospheres demonstrated better extended release in this experiment.
Figure 6:
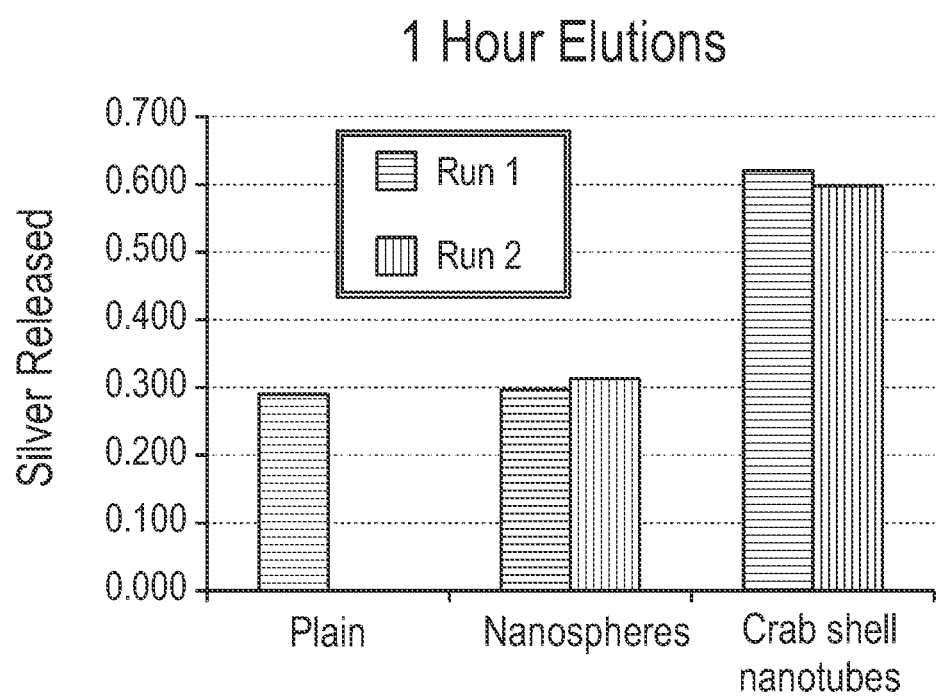
FIG. 6 is a graph depicting the release of a silver antimicrobial agent from silicone rubber containing crab $CaCO_3$ nanochannels vs $CaCO_3$ nanospheres. Under certain conditions, including long loading times, crab nanochannels may outperform the nanospheres loaded with silver.

The impregnated nanosphere-LSR materials were then treated with 1%-5% citric acid, 0.2% hydrochloric, 1% sulfuric acid, or 0.5% phosphoric acid at 50-70° C. to dissolve the calcium carbonate structures, thereby providing open channels or nanopores for the loading of the antimicrobial solutions. Antimicrobials were either loaded separately or in combination with another antimicrobial. Briefly CHG was loaded in ethanol at a high temperature of 55-75° C. for 0.5-3.0 hours. Silver chloride (AgCl2) Silver Sulfadiazine (C10H9AgN4O2S), or silver nitrate (AgNO3) was loaded in a buffer to optimize the solubility of the silver ions, as described by Tsiporas (Tsipouras N, Rix C J, Brady PH. Clin Chem. 1995 January; 41(1):87-91. Solubility of silver sulfadiazine in physiological media and relevance to treatment of thermal burns with silver sulfadiazine cream). The antimicrobials were loaded into several different materials of the present disclosure as follows: 1 nM of silver sulfadiazine solution (FIGS. 1 and 4), 50 mM silver nitrate solution (FIGS. 2 and 5), or 10 mg/mL of blue dye (FIG. 3) and the elution characteristics were tested.

Alternatively dual nanoparticles were made by forming a novel co-nanocrystal of CHG and silver. The method of Sun and Xia (2002) was modified to develop a copolymerized silver and CHG. Briefly 5 ml of anhydrous ethylene glycol (Aldrich, 99.8%) was heated at 150-200° C. for 1-3 hours. Silver nitrate AgNO3 in ethylene glycol and CHG in PVP/ethylene glycol (0.275-.500) M were codispensed into the hot ethylene glycol by means of a two-channel extruder at a flow rate of 0.1-0.75 ml/min. The reaction mixture was then continued with heating at 160° C. for another 0.5-2 hours.

The formation of co-nanocrystalline silver and CHG is then rinsed in water, and filtered to remove any large particles (nanowires). The material is then ready for loading in the LSR-acid treated parts. These CHG/Silver loaded LRS are expected to reduce the incidence of catheter related blood stream infections (CRBSI), SSI, wound care infections, and other hospital acquired infections (HAI). FIGS. 1-6 depict the elution of various antimicrobial compounds or blue dye from the present materials.

Alternatively, 1-7 g/L of hydrolyzed xanthan gum was used to reduce and stabilize the silver nanoparticles as described by Emam and Zaran (2015, International Journal of Biological Macromolecules 75: 106-114). For example, 3 g/L hydrolyzed xanthan gum was used at pH 12 to reduce and stabilize silver nitrate (1 mM $AgNO_3$).

Tables 1 and 2 demonstrate the killing of two bacteria isolates (*S. aureus* and *P. aeruginosa*) over time with septa that have been loaded with 5% of calcium carbonate nanospheres and 5% chrlorhexidine diacetate (CHDA). The medical matrix is prepared by polymerizing liquid silicone rubber in the presence of 5% by weight of calcium carbonate nanospheres and 5% by weight of chlorhexidine diacetate. Instead of dissolving the nanospheres with citric acid to form nanopores, the nanospheres are untreated, thereby, providing enhanced compression characteristics to the liquid silicone rubber (LSR) and improving the release characteristic of the CHDA over both a short period of time (<24 hrs) and for an extended period time (up to about 8 days). Colony forming unit (CFU) levels are reduced after 3 hours for both gamma sterilized and unsterilized septums. The unsterilized and sterilized septums have a six fold log reduction of bacteria by day six and the septums are not compromised by the gamma (25 kGa) and ethylene oxide dual sterilization process.

TABLE 1

*P. aeruginosa*

| Timepoints for *p. aeruginosa* | Sterile | Unsterile |
| --- | --- | --- |
| 3 Hour CFU/mL | 1.79E+05 | 1.59E+05 |
| 6 Hour CFU/mL | 7.71E+03 | 7.49E+03 |
| 24 Hour CFU/mL | 4.30E+02 | 3.52E+03 |
| 2 Day CFU/mL | 1.13E+02 | 8.67E+01 |
| 4 Day CFU/mL | 6.07E+02 | 5.23E+02 |
| 6 Day CFU/mL | 0.00E+00 | 0.00E+00 |
| 8 Day CFU/mL | 0.00E+00 | 0.00E+00 |

TABLE 2

*S. aureus*

| Timepoints for *s. aureus* | Sterile | Unsterile |
| --- | --- | --- |
| 3 Hour CFU/mL | 1.26E+04 | 1.05E+04 |
| 6 Hour CFU/mL | 3.13E+03 | 4.40E+03 |
| 24 Hour CFU/mL | 1.20E+02 | 4.13E+02 |
| 2 Day CFU/mL | 2.17E+02 | 0.00E+00 |
| 4 Day CFU/mL | 0.00E+00 | 0.00E+00 |
| 6 Day CFU/mL | 0.00E+00 | 0.00E+00 |
| 8 Day CFU/mL | 0.00E+00 | 0.00E+00 |

Although there have been described particular embodiments of the present invention of new and useful materials comprising antimicorbial agents, it is not intended that such references be construed as limitations upon the scope of this invention except as set forth in the following claims.

What is claimed is:

1. A method of preparing an antimicrobial medical material having nanopores or nanochannels, and an antimicrobial agent disposed therein comprising:
    providing a prepolymeric material;
    polymerizing the prepolymeric material in the presence of a nanomaterial to form a medical polymer having the nanomaterial disposed therein;
    removing the nanomaterial to provide a medical matrix having nanopores or nanochannels, wherein removing the nanomaterial comprises dissolving the nanomaterial with a dilute acid, the nanomaterial comprising calcium carbonate, liposomes, carbon nanotubes, nano-gold particles, silica nanoparticles or a combination thereof;
    dissolving a first antimicrobial agent of the antimicrobial agent in a first antimicrobial solvent to provide a first antimicrobial solution;
    dissolving a second antimicrobial agent of the antimicrobial agent in a second antimicrobial solvent to provide a second antimicrobial solution;
    reacting a mixture of the first antimicrobial solution and the second antimicrobial solution to provide a co-nanocrystalline antimicrobial agent of the antimicrobial agent; and
    loading into the nanopores or nanochannels of the medical matrix the co-nanocrystalline antimicrobial agent to provide the antimicrobial medical material.

2. The method of claim 1, further comprising forming the medical matrix into a predetermined shape.

3. The method of claim 1, wherein the prepolymeric material comprises a liquid silicone rubber.

4. The method of claim 1, wherein the nanomaterial is selected from the group consisting of calcium carbonate, liposomes, carbon nanotubes, nano-gold particles, silica nanoparticles or a combination thereof.

5. The method of claim 1 wherein the dilute acid is selected from the group consisting of 1 to 5% citric acid, 0.1 to 0.5% hydrochloric acid, 0.1 to 2% sulfuric acid, 0.1 to 2% phosphoric acid or a mixture thereof.

6. The method of claim 1, wherein the medical polymer having the nanomaterial disposed therein comprises about 0.5% to about 20% by weight of the nanomaterial.

7. The method of claim 1, wherein removing the nanomaterial to provide the medical matrix further includes heating at least the nanomaterial.

8. The method of claim 1, wherein the nanomaterial is heated to a temperature in a range of from 60 to 70° C.

9. The method of claim 1, wherein at least one of the first antimicrobial solution or the second antimicrobial solution comprises chlorhexidine.

10. The method of claim 1, wherein the first antimicrobial solution comprises chlorhexidine, and the second antimicrobial solution comprises silver.

\* \* \* \* \*